United States Patent
Zhang et al.

(10) Patent No.: US 8,979,130 B2
(45) Date of Patent: Mar. 17, 2015

(54) FIVE-POINT SAFETY BELT AND SAFETY BELT UNLOCKING MECHANISM

(71) Applicant: Suzhou Eagle Electric Vehicle Manufacturing Co., Ltd., Suzhou (CN)

(72) Inventors: Xueqing Zhang, Suzhou (CN); Ke Lan, Suzhou (CN); Anding Zhu, Suzhou (CN)

(73) Assignee: Suzhou Eagle Electric Vehicle Manufacturing Co., Ltd., Suzhou (CN)

( * ) Notice: Subject to any disclaimer, the term of this patent is extended or adjusted under 35 U.S.C. 154(b) by 0 days.

(21) Appl. No.: 13/951,225

(22) Filed: Jul. 25, 2013

(65) Prior Publication Data

US 2013/0307255 A1 Nov. 21, 2013

Related U.S. Application Data

(63) Continuation of application No. PCT/CN2011/001130, filed on Jul. 8, 2011.

(30) Foreign Application Priority Data

Apr. 2, 2011 (CN) .......................... 2011 1 0083825

(51) Int. Cl.
*A44B 11/25* (2006.01)
*B60R 22/00* (2006.01)
*B60R 22/02* (2006.01)
*B60R 22/32* (2006.01)

(52) U.S. Cl.
CPC ................. *B60R 22/00* (2013.01); *B60R 22/02* (2013.01); *B60R 22/32* (2013.01); *A44B 11/2526* (2013.01); *B60R 2022/027* (2013.01)

USPC ........... 280/808; 280/801.1; 180/268; 24/634

(58) Field of Classification Search
CPC ................................................... A44B 11/2549
USPC ................. 280/801.1, 808; 24/165, 182, 634; 180/268

See application file for complete search history.

(56) References Cited

U.S. PATENT DOCUMENTS

| 4,468,843 | A | | 9/1984 | Duclos et al. | |
|---|---|---|---|---|---|
| 5,103,771 | A | * | 4/1992 | Lee | 119/776 |
| 5,123,673 | A | * | 6/1992 | Tame | 280/801.1 |
| 5,845,377 | A | * | 12/1998 | Bibeault | 24/634 |

(Continued)

FOREIGN PATENT DOCUMENTS

| CN | 2848646 Y | 12/2006 |
|---|---|---|
| CN | 101554866 A | 10/2009 |

(Continued)

*Primary Examiner* — Nicole Verley
(74) *Attorney, Agent, or Firm* — Seed IP Law Group PLLC

(57) ABSTRACT

A five-point safety belt and a safety belt unlocking mechanism. The safety belt includes a three-point safety belt, a two-point safety belt and two locking mechanisms. The unlocking mechanism includes a safety belt and a safety belt locking mechanism arranged on two sides of a passenger. Each locking mechanism is provided with a button integrally formed therewith for unlocking the safety belt. The unlocking mechanism is also provided with a cable, two ends of the cable are respectively connected to one end of the two buttons for unlocking. A handle is connected to a middle section of the cable. The handle may be arranged in front of the passenger, and the safety belt can be unlocked synchronously through the handle, which can be operated easily.

5 Claims, 10 Drawing Sheets

(56) References Cited

U.S. PATENT DOCUMENTS

| | | | |
|---|---|---|---|
| 6,474,435 B1* | 11/2002 | Devereaux | 180/270 |
| 6,487,761 B2* | 12/2002 | Van Tassel | 24/606 |
| 7,131,668 B2* | 11/2006 | Go | 280/808 |
| 7,640,639 B2* | 1/2010 | de Bien | 24/615 |
| 7,954,211 B2* | 6/2011 | De Bien | 24/606 |
| 8,181,318 B2* | 5/2012 | Anscher | 24/634 |
| 8,209,825 B2* | 7/2012 | Carter | 24/634 |
| 8,464,407 B2* | 6/2013 | Von Der Ahe et al. | 24/634 |
| 8,490,256 B2* | 7/2013 | Carter et al. | 24/603 |
| 2002/0056983 A1* | 5/2002 | Jernstrom | 280/806 |
| 2002/0089163 A1 | 7/2002 | Bedewi et al. | |
| 2004/0113412 A1* | 6/2004 | Go | 280/808 |
| 2006/0219029 A1* | 10/2006 | Murphy et al. | 73/862.391 |
| 2008/0252058 A1* | 10/2008 | Gray | 280/801.1 |
| 2010/0025976 A1* | 2/2010 | Murtha et al. | 280/801.1 |
| 2010/0313392 A1* | 12/2010 | Anscher | 24/616 |
| 2011/0127307 A1* | 6/2011 | Carter et al. | 224/271 |
| 2011/0239419 A1* | 10/2011 | Carter | 24/606 |

FOREIGN PATENT DOCUMENTS

| | | |
|---|---|---|
| CN | 201385639 Y | 1/2010 |
| CN | 201961275 U | 9/2011 |
| JP | 2010030367 A | 2/2010 |
| WO | 03/042011 A1 | 5/2003 |

* cited by examiner

FIVE-POINT SAFETY BELT AND SAFETY BELT UNLOCKING MECHANISM

BACKGROUND

1. Technical Field

The present disclosure relates to a safety belt and a safety belt unlocking mechanism.

2. Description of the Related Art

In modern lives, motor vehicles bring much convenience for transportation because of their high speed. However, when accidents involving motor vehicles happen, it may hurt the passengers because the speed of the motor vehicles is too fast. Hence, people have invented safety belts to fix the passengers to the motor vehicles when the motor vehicles are moving. Under this condition, when collision accidents of motor vehicles happen, the passengers may be prevented from being throw away from the motor vehicles so as to decrease injuries of the passengers. The structures of the conventional safety belts include a two-point type or a three-point type. Usually, one end of the two-point safety belt is winded in a belt grabber through a shoulder position of the passenger, and the other end of the two-point safety belt can be pulled out to be locked in a locking mechanism to the other side of the waist. Regarding the three-point safety belt, two ends thereof are usually arranged on the same side of the passenger, wherein one of the two ends is set adjacent to the shoulder and the other of the two ends is set adjacent to the waist. Any of the two ends is winded in a belt grabber of the motor vehicle and the remaining end is fastened to the motor vehicle. A locking member which is freely slides between the two ends of the safety belt is set between the two ends. When in use, the safety belt is pulled out from the motor vehicle and is stretched across a front side of the passenger to be fixed to the locking mechanism which is located at the other side of the waist of the passenger. As a result, the three-point safety belt provides two fixing points at one side of the passenger and one fixing point at the other side of the passenger.

The locking member is usually sheetmetal and includes a slot through which the safety belt extends. The locking member further typically includes a locking hole for mating with the locking mechanism. The locking mechanism usually includes an insertion slit for insertion of the locking member. The locking mechanism is lockable with the locking hole of the locking member so as to realize fixation therebetween. The locking mechanism further includes an unlocking mechanism integrally formed therewith. Since the locking mechanism is usually arranged at the waist position of the passenger, the unlocking mechanism is usually a button for the passenger to easily apply force thereon. In a specified application, the button is usually arranged adjacent to the insertion slit. During unlocking, the button is downwardly pressed so as to unlock the locking mechanism and the locking member.

However, it is inconvenient for the passenger to know the exact position of the unlocking mechanism which is set near the waist of the passenger. When in use, the passenger possibly needs to lower his head to observe the exact position of the button before pressing the button, which increases the use difficulty thereof. Besides, an area of the button is usually small, the passenger is capable of only using a thumb to operate, thereby great force is needed and it improves difficulty for those weak people to implement. Furthermore, either the three-point safety belt or the two-point safety belt brings unbalanced force applied to the passenger, which may render the passenger feel uncomfortable. Besides, it is easy for the passenger to break away from a small force side of the safety belt and get injured.

BRIEF SUMMARY

An embodiment provides a five-point safety belt and a safety belt unlocking mechanism to facilitate solving the above problems.

An embodiment provides a safety belt unlocking mechanism with better protection function.

In an embodiment, a five-point safety belt includes a three-point safety belt, a two-point safety belt and two locking mechanisms arranged at two sides of a passenger. The three-point safety belt is provided with two points arranged at a first side of a passenger and a first point arranged at a second side of the passenger. The two points are corresponding to a shoulder and a waist of the passenger. The first point is corresponding to the waist of the passenger. The two-point safety belt is provided with a second point arranged at the second side of the passenger and a third point arranged at the first side of the passenger. The second point is corresponding to the shoulder of the passenger. The third point is corresponding to the waist of the passenger.

In an embodiment, the three-point safety belt includes a first locking member positioned between the two points at the first side. The five-point safety belt includes a first locking mechanism arranged at the second side. The first locking mechanism is corresponding to the waist of the passenger for locking with the first locking member.

In an embodiment, the two-point safety belt includes a second locking member positioned at a free end thereof. The five-point safety belt includes a second locking mechanism arranged at the first side. The second locking mechanism is corresponding to the waist of the passenger for locking with the second locking member.

In an embodiment, a safety belt unlocking mechanism unlocks a locking member set on a safety belt from a locking mechanism. The locking mechanism includes a button integrally formed therewith for unlocking the safety belt. The button automatically returns back after unlocking the locking member. One end of the button is connected with a cable. The other end of the cable is connected with a handle.

In an embodiment, the safety belt unlocking mechanism includes a first reversion assembly set on the cable for pulling the handle towards a position where the button returns back, when the handle is pulled.

In an embodiment, the first reversion assembly includes a first sleeve provided with an upper restricting portion and a lower restricting portion, a first sliding member slideable between the upper restricting portion and the lower restricting portion, a first supporting spring mounted between the first sliding member and the lower restricting portion, and an engaging member on top of the first sliding member. The cable extends through the first sliding member and includes an engaging portion fixed on top of the first sliding member. The engaging member is lockable with the button.

In an embodiment, the engaging member and the first sliding member may be integral or twopiece. The engaging portion of the cable is capable of extending through the engaging member.

In an embodiment, an inner side of the first sleeve and the first sliding member include a protrusion and a recess along a sliding direction of the first sliding member. The protrusion and the recess are mateable with each other.

In an embodiment, the upper restricting portion includes a protrusion formed on an inner side of the first sleeve to resist against the first sliding member so as to prevent the first sliding member from continuing sliding.

In an embodiment, the lower restricting portion includes an opening for loading the first sliding member and the first supporting spring therein, a first baffle at bottom of the opening and at least one hook. The first sleeve includes a slit corresponding to a bottom side of the opening. One side of the first baffle is inserted into the slit and the other side of the first baffle is locked by the at least one hook.

In an embodiment, a five-point safety belt unlocking mechanism includes a safety belt and two locking mechanisms arranged at two sides of a passenger or lateral sides of two different passengers. Each locking mechanism includes a button integrally formed therewith for unlocking the safety belt. The safety belt unlocking mechanism further includes a cable with two ends thereof connected to the buttons, and a handle connected to a middle section of the cable.

In an embodiment, the handle is connected to a second sliding member via a connecting cable. The second sliding member includes a bearing and a pulley mounted to the bearing. The middle section of the cable spools on the pulley.

In an embodiment, the safety belt unlocking mechanism further includes a second reversion assembly which comprises a second sleeve and a second sliding member slideable in the second sleeve.

In an embodiment, the second reversion assembly includes a second supporting spring compressed between the second sliding member and the second sleeve.

In an embodiment, the handle is pivotally mounted to an end of the second sleeve. One end of the connecting cable is connected to the second sliding member and the other end of the connecting cable is connected to a middle portion of the handle.

In an embodiment, the safety belt unlocking mechanism further includes a first reversion assembly between the cable and the button. The first reversion assembly includes a first sleeve provided with an upper restricting portion and a lower restricting portion, a first sliding member slideable between the upper restricting portion and the lower restricting portion, and a first supporting spring compressed between the first sliding member and the lower restricting portion.

In an embodiment, the lower restricting portion of the first sleeve includes an opening and a first baffle received in the opening.

In an embodiment, the lower restricting portion includes a slit and at least one hook. The slit is formed on an inner side of the first sleeve and located adjacent to the opening. One side of the first baffle is inserted into the slit and the other side of the first baffle is locked by the at least one hook.

In an embodiment, the upper restricting portion includes a protrusion formed on an inner side of the first sleeve.

In an embodiment, the safety belt unlocking mechanism further includes an engaging member on top of the first sliding member, and the engaging member is connected to the button.

In an embodiment, a five-point safety belt facilitates safety of the passenger. The passenger receives symmetrical forces and feels more comfortable. Besides, through pulling the handle, the safety belts of one or more passengers can be unlocked for reducing the workload of the passengers. Furthermore, the handle can be arranged in front of the passenger for easily operating.

DETAILED DESCRIPTION

Figure 1:
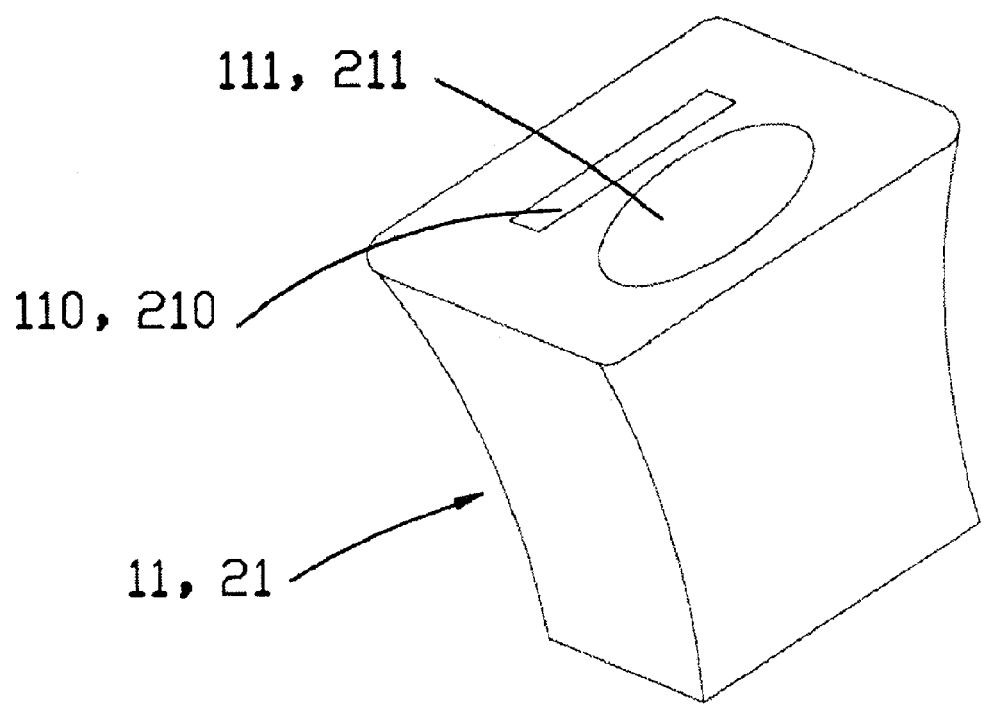
FIG. 1 is a schematic perspective view of a safety belt locking mechanism in accordance with an illustrated embodiment.
Figure 2:
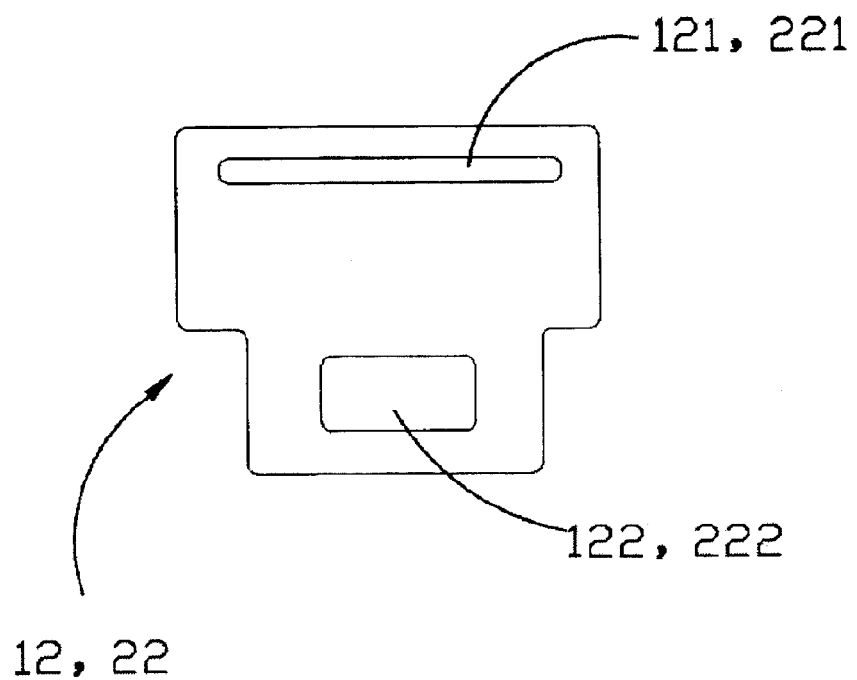
FIG. 2 is a schematic view of a safety belt locking member in accordance with an illustrated embodiment.
Figure 3:
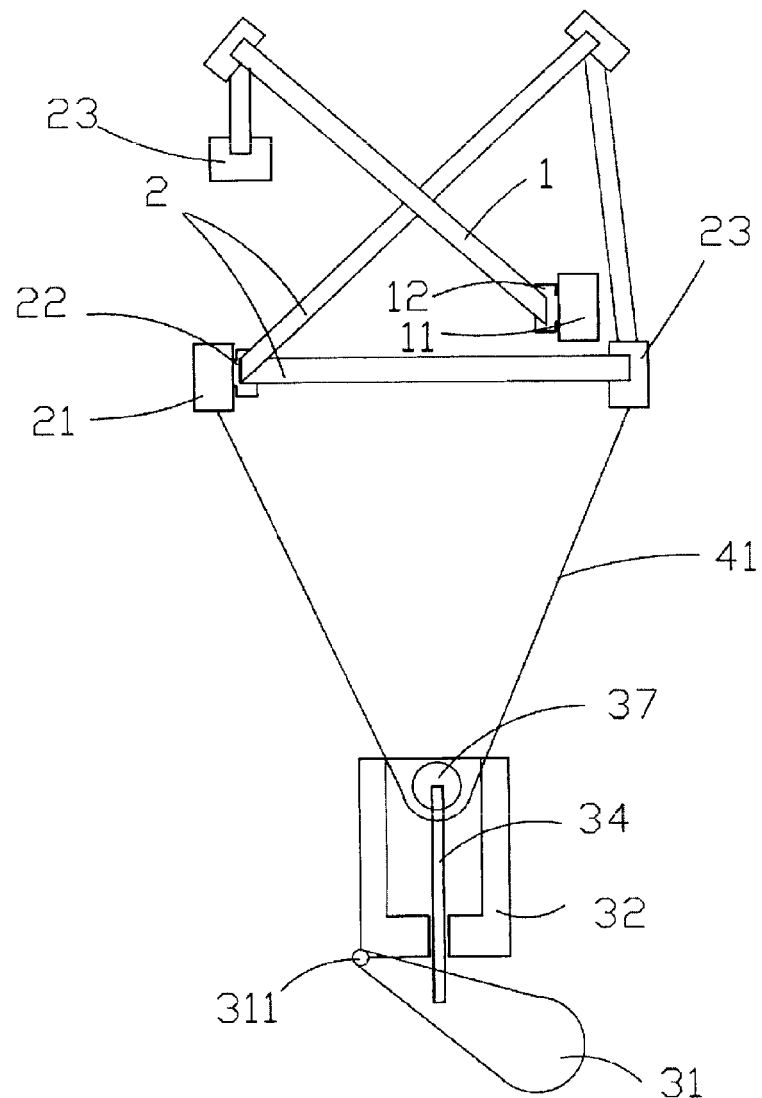
FIG. 3 is a schematic view of a five-point safety belt and a safety belt unlocking mechanism in accordance with an illustrated embodiment.
Figure 4:
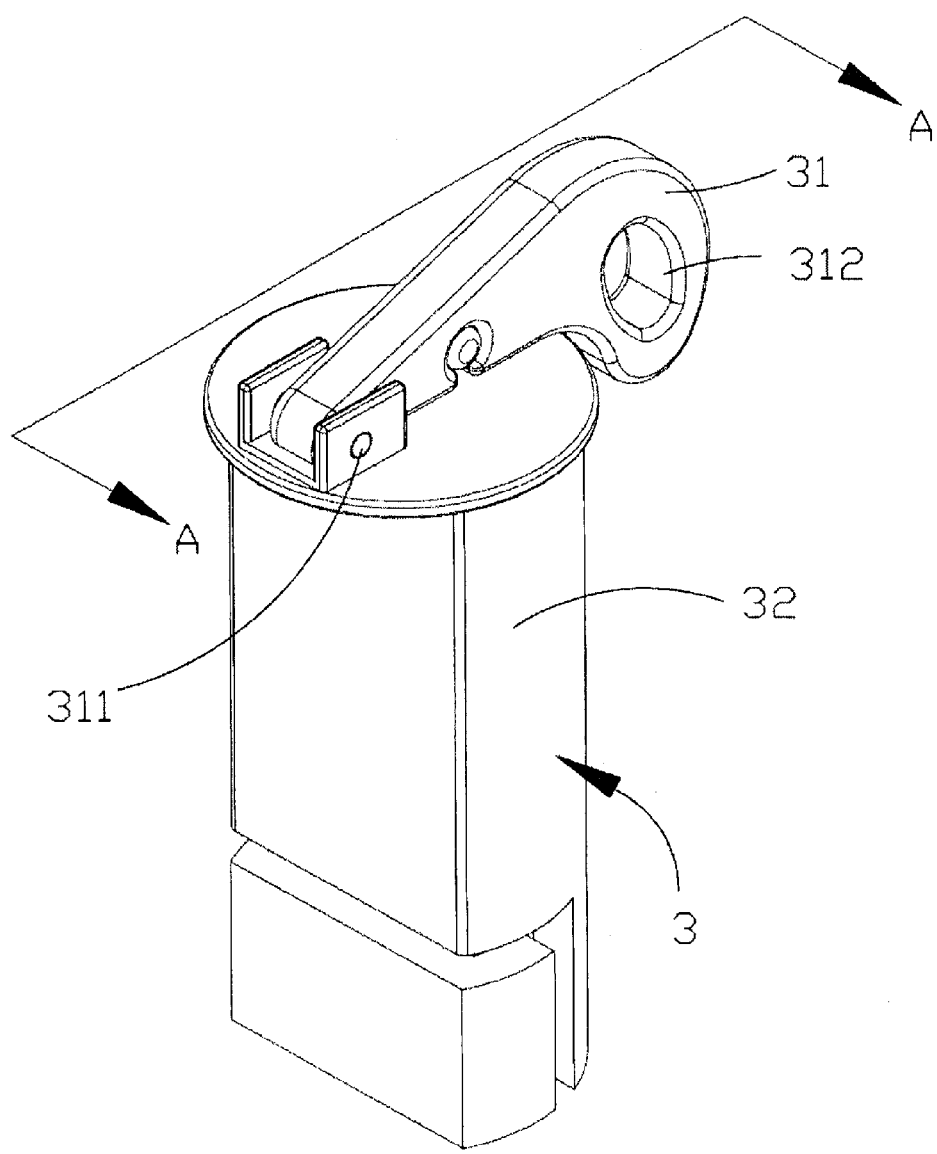
FIG. 4 is a perspective view of a second reversion assembly of the safety belt unlocking mechanism in accordance with an illustrated embodiment.
Figure 5:
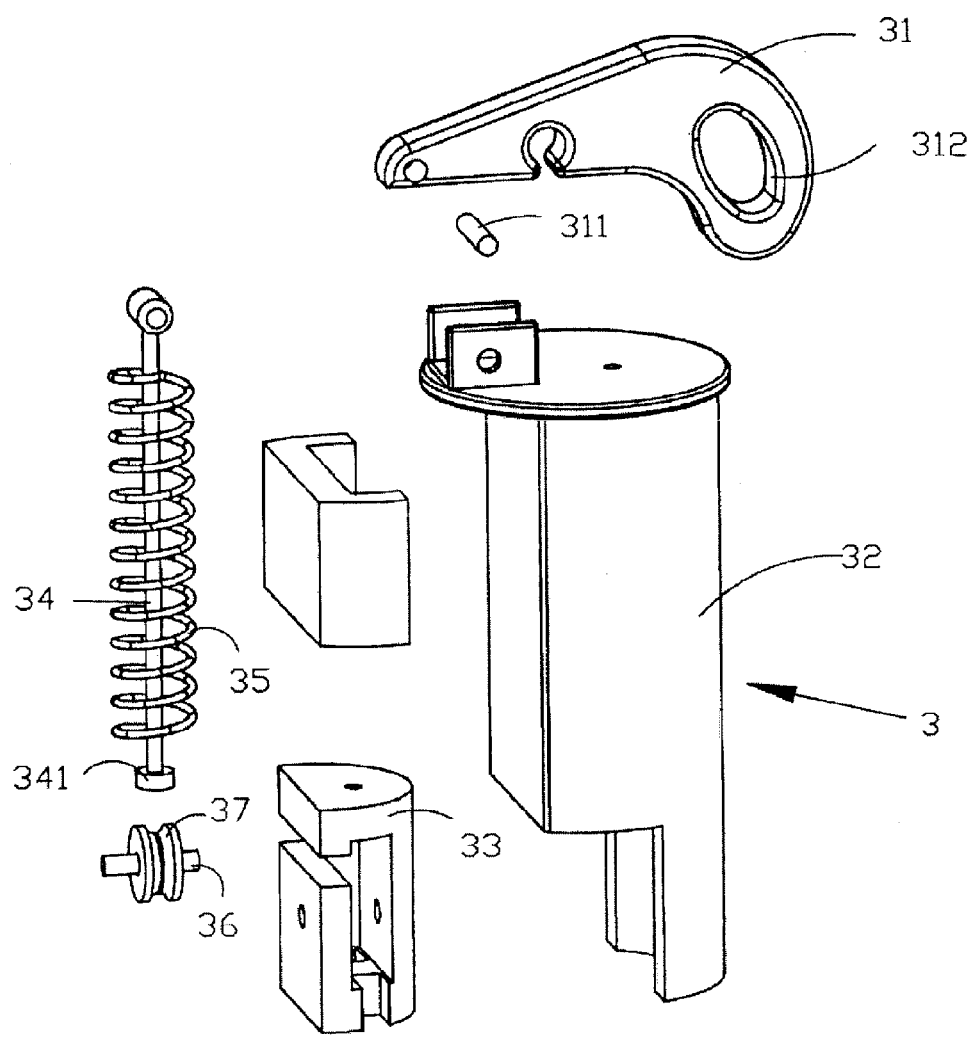
FIG. 5 is an exploded view of the second reversion assembly shown in
FIG. 4.
Figure 6:
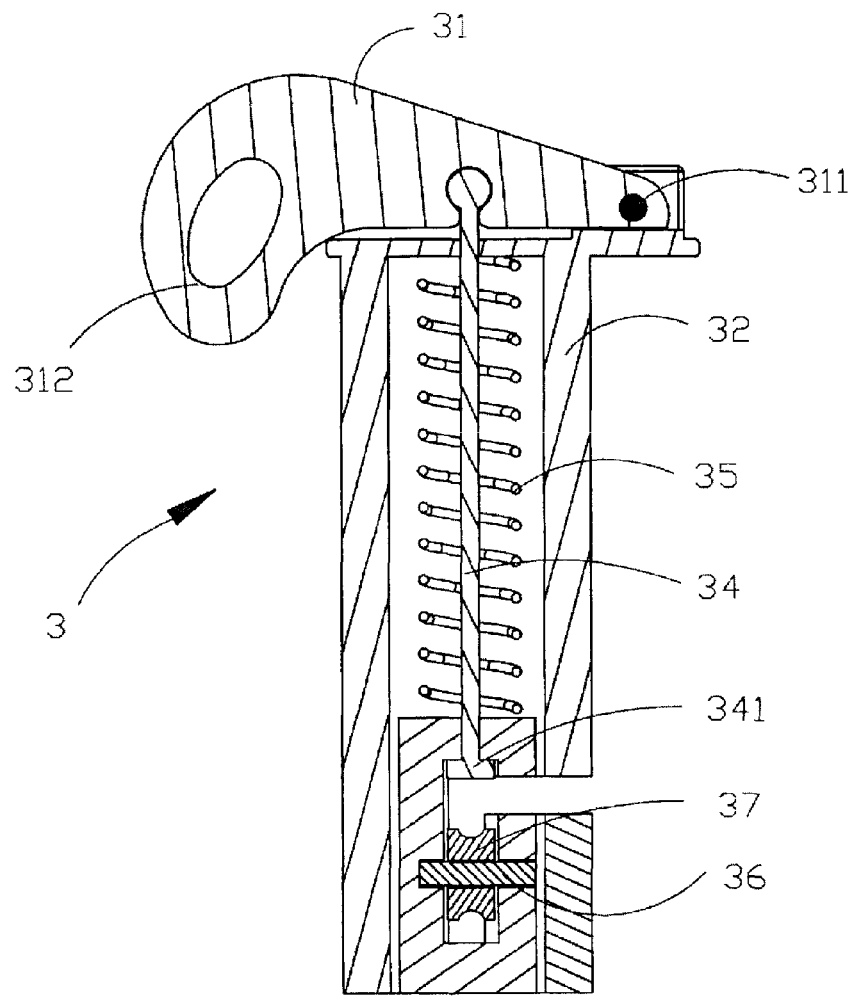
FIG. 6 is a cross-sectional view of the second reversion assembly taken along line A-A of FIG. 4.
Figure 7:
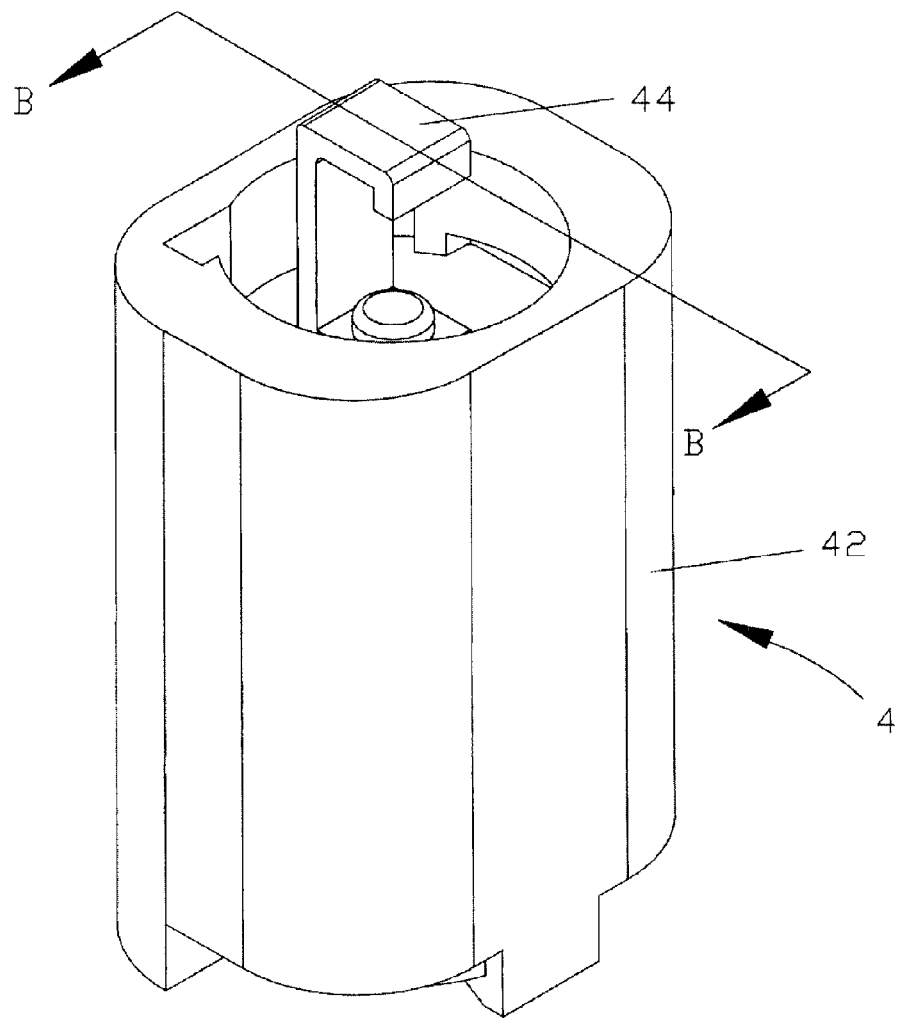
FIG. 7 is a perspective view of a first reversion assembly of the safety belt unlocking mechanism in accordance with an illustrated embodiment.
Figure 8:
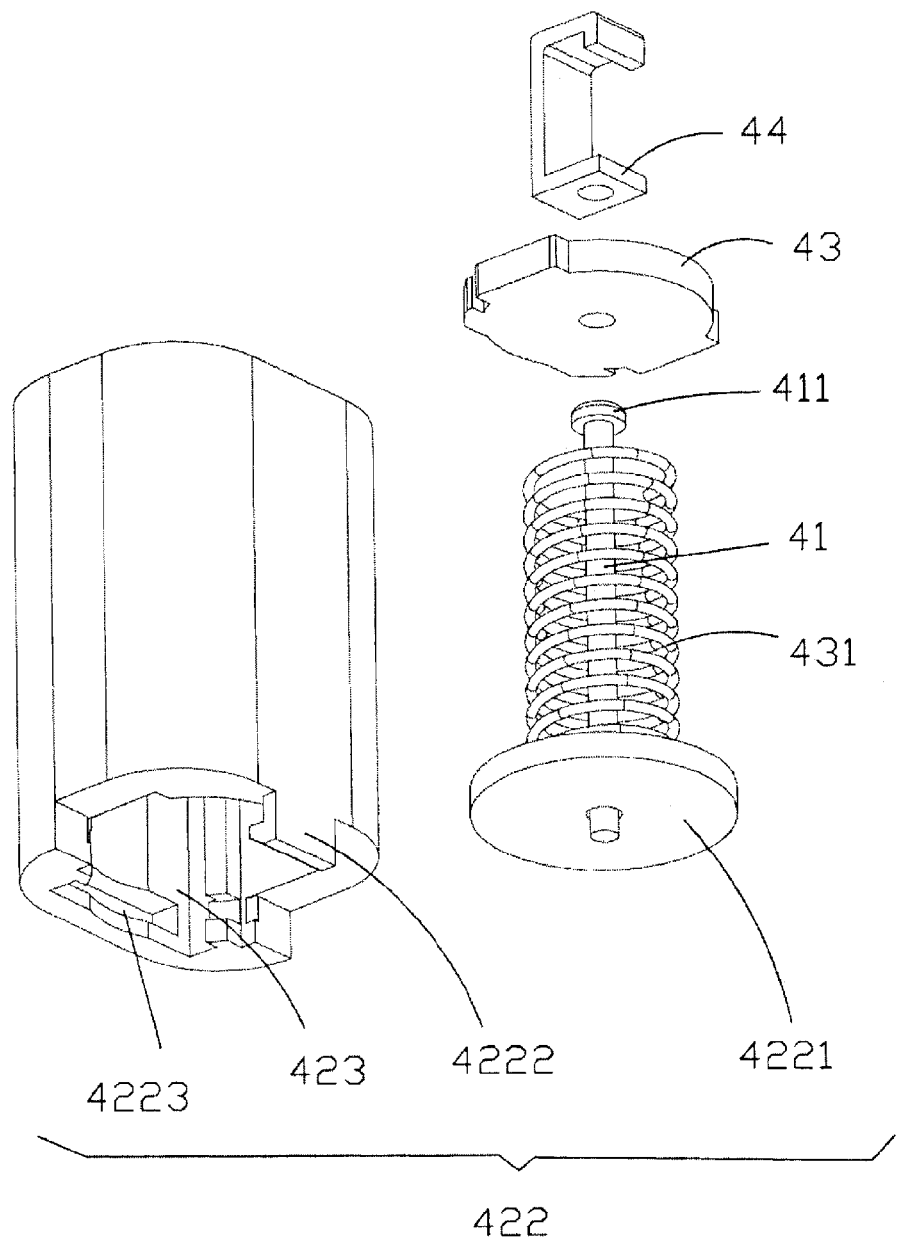
FIG. 8 is an exploded view of the first reversion assembly shown in
FIG. 7.
Figure 9:
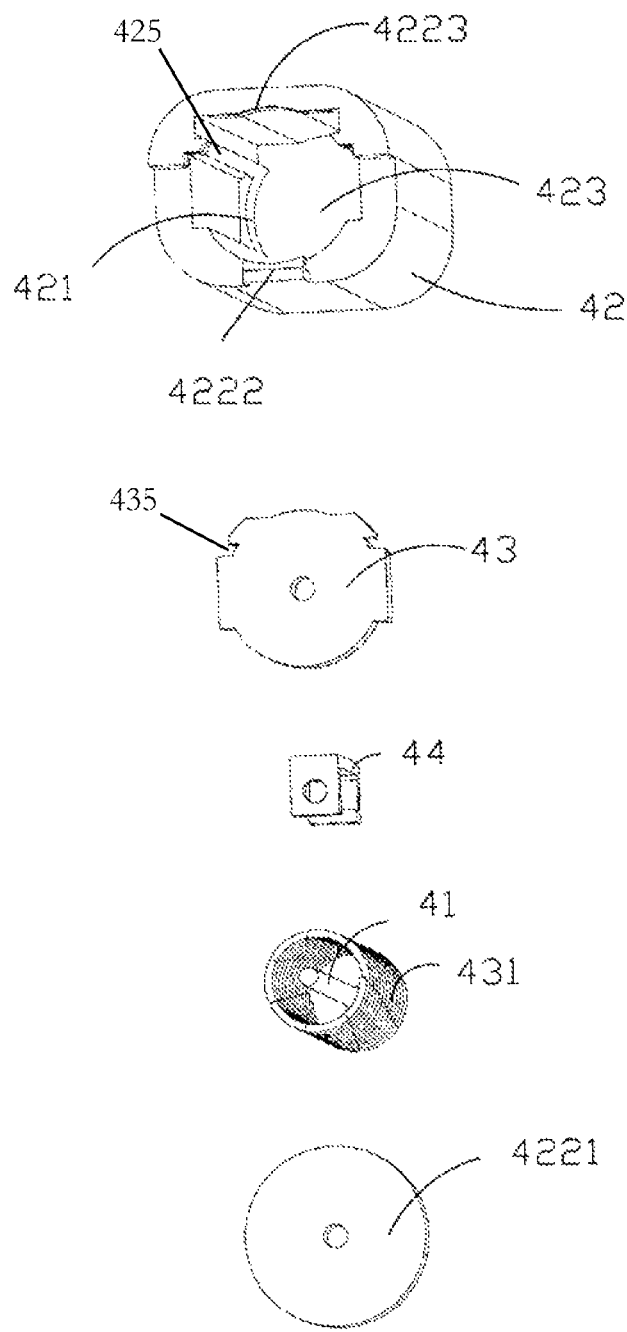
FIG. 9 is another exploded view of the first reversion assembly shown in FIG. 7.
Figure 10:
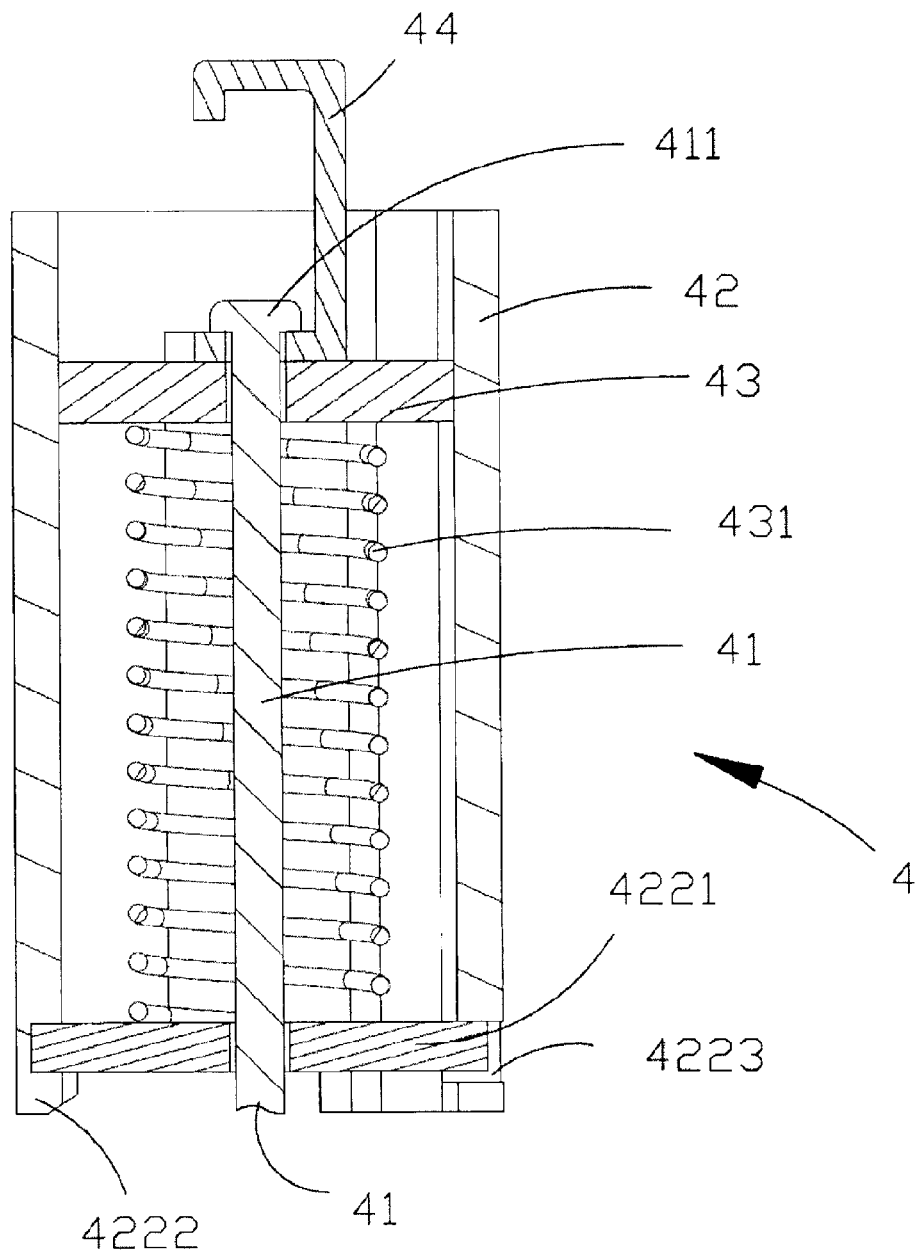
FIG. 10 is a cross-sectional view of the first reversion assembly taken along line B-B of FIG. 7.

Referring to FIGS. 1 to 10, the present application discloses a five-point safety belt which includes a two-point safety belt 1 and a three-point safety belt 2. In an example embodiment, two points of the three-point safety belt 2 are arranged at a left side of a passenger, wherein one of the two points is substantially located near a left shoulder of the passenger and the other of the two points is substantially located near a left waist of the passenger. At least one of the two points is winded in a belt grabber 23 of a motor vehicle. Besides, a moveable locking member 22 is mounted between the two points. When in use, the safety belt is pulled from the motor vehicle and the locking member 22 is stretched across a front side of the passenger. The locking member 22 is fixed to a locking mechanism 21 located near a right waist of the passenger. As a result, the safety belt provides two fixing points respectively corresponding to the left shoulder and the left waist of the passenger, and a first fixing point corresponding to the right waist of the passenger. It is understandable that the safety belt provides protection from the left shoulder to the right waist, and from the left waist to the right waist. Besides, the two-point safety belt 1 is located near a right shoulder of the passenger, wherein one end of the two-point safety belt 1 is winded in another belt grabber 23 and the other end of the two-point safety belt 1 can be pulled out to be fixed to a locking mechanism 11 which is located near the left waist of the passenger. According to an embodiment of a five-point safety belt of the present application, not only the left and right shoulders but also the left and right waists of the passenger are provided with locking points which are symmetrical with each other from left to right. As a result, the passenger receives symmetrical forces so as to be more comfortable. Besides, the safety belt forms a X-shaped cross at a front of the passenger and a horizontal bound of the waist. It facilitates providing increased safety of the passenger because of multiple bounds. The above embodiment is only an example embodiment and in other embodiments, positions of the three-point safety belt 2 and the two-point safety belt 1 can be exchanged. The windable end of the safety belt can also be set near the waist.

The safety belts 1, 2 are provided with the locking members 12, 22 for locking with the locking mechanisms 11, 21 as so to realize passenger fixation. The locking members 12, 22 are ordinarily sheetmetals and include slots 121, 221 through which the safety belts extend. When the locking members 12, 22 are pulled, the safety belts can be extracted accordingly. The locking members 12, 22 further include locking holes 122, 222 for mating with the locking mechanisms 11, 21. The locking mechanisms 11, 21 include insertion slits 110, 210 into which the locking members 12, 22 are inserted. The locking mechanisms 11, 21 are lockable with the locking holes 122, 222 of the locking members 12, 22 so as to realize fixation therebetween.

The locking mechanisms 11, 21 further include unlocking mechanisms integrally formed therewith. Since the locking mechanisms 11, 21 are usually arranged at waist positions of the passenger, the unlocking mechanisms are usually buttons 111, 211 which are easy for the passenger to apply force thereon. In an example embodiment, the buttons 111, 211 are usually arranged beside the insertion slits 110, 210 of the locking members 12, 22. When unlocking the locking mechanisms 11, 21 and the locking members 12, 22 are needed, the buttons 111, 211 are downwardly pressed. According to the illustrated embodiment of the present application, a handle 31 is connected below the buttons 111, 211 under condition that when the handle 31 is pulled, the buttons 111, 211 will be driven to slide downwardly and then the locking members 12, 22 are unlocked.

The handle 31 is connected to each end of the buttons 111, 211 via a cable 41 for pulling the buttons 111, 211. The cable 41 is associated with a first reversion assembly 4 which pulls the handle 31 moving towards positions where the buttons 111, 211 return back and helps the handle 31 back to its original position, when the handle 31 is pulled. The first reversion assembly 4 includes a first sleeve 42 provided with an upper restricting portion 421 and a lower restricting portion 422, a first sliding member 43 slideable between the upper restricting portion 421 and the lower restricting portion 422, and a first supporting spring 431 mounted between the first sliding member 43 and the lower restricting portion 422. The first supporting spring 431 is a coiled spring which is compressed between the first sliding member 43 and the lower restricting portion 422. One end of the cable 41 extends through the first sliding member 43 and is provided with an engaging portion 411 fixed on top of the first sliding member 43. The first reversion assembly 4 further includes an engaging member 44 on top of the first sliding member 43 for locking the buttons 111, 211. The engaging member 44 and the first sliding member 43 are alternatively integral or two-piece. The engaging portion 411 of the cable 41 may also extend through the engaging member 44. Under this condition, when the cable 41 is pulled by the handle 31, the first sliding member 43 and the engaging member 44 are both driven to slide downwardly under the action of the engaging portion 411 of the cable 41, and then the buttons 111, 211 of the unlocking mechanisms are driven to slide downwardly so as to realize unlocking. When the handle 31 is loosen, the first supporting spring 431 restores and drives the first sliding member 43 to move upwardly so as to reset the buttons 111, 211.

In an embodiment, the upper restricting portion 421 includes a protrusion formed on an inner side of the first sleeve 42. The inner side of the first sleeve 42 and the first sliding member 43 include a mateable protrusion 425 and a recess 435 along a sliding direction of the first sliding member 43. When the first sliding member 43 slides relative to the first sleeve 42, the first sliding member 43 can be prevented from rotating in the first sleeve 42. The protrusion of the upper restricting portion 421 can be used to resist against the first sliding member 43 so as to prevent the first sliding member 43 from continuing sliding upwardly. The lower restricting portion 422 of the first sleeve 42 includes an opening 423 for loading the first sliding member 43 and the first supporting spring 431 therein. The lower restricting portion 422 further includes a slit 4223 corresponding to a bottom side of the opening 423, a first baffle 4221 at bottom of the opening 423 and at least one hook 4222. One side of the first baffle 4221 is inserted into the slit 4223 and the other side of the first baffle 4221 is pressed in and locked by the hook 4222. The first baffle 4221 is jointly connected to the first sleeve 42 with the hook 4222 fastening the first baffle 4221.

The above embodiment can be applied to a single two-point safety belt 1, or a single three-point safety belt 2, or any combination thereof.

In an embodiment of the combination of the two-point safety belt 1 and the three-point safety belt 2, there are two unlocking mechanisms. Two cables 41 are provided to be respectively connected to the buttons 111, 211 of the unlocking mechanisms. When the buttons 111, 211 are pulled by the cables 41, unlocking the locking members 12, 22 is realized.

According to an embodiment of the combination of the two-point safety belt 1 and the three-point safety belt 2, another embodiment is provided. Distal ends of the single cable 41 are respectively connected to two first sliding members 43 of the two first reversion assemblies 4. The handle 31 is connected to a middle section of the cable 41 via a second reversion assembly 3. When the cable 41 is pulled, it simultaneously drives the two first reversion assemblies 4 and then simultaneously unlocks the two locking mechanisms 11, 21.

The second reversion assembly 3 includes a second sleeve 32, a second sliding member 33 slideable in the second sleeve 32, and a connecting cable 34 connecting the second sliding member 33 and the handle 31. One end of the connecting cable 34 is connected to the second sliding member 33 and the other end of the connecting cable 34 is connected to a middle portion of the handle 31. One end of the handle 31 is pivotally mounted to the second sleeve 32 via a spindle 311 and the other end of the handle 31 includes an operation portion for being used by a passenger. The one end of the connecting cable 34 includes an engaging portion 341 extending through the second sliding member 33. The second reversion assembly 3 further includes a second supporting spring 35 compressed between the second sliding member 33 and one end of the second sleeve 32. The second supporting spring 35 is a coiled spring. When an operation of the handle 31 is completed and then the handle 31 is loosen, the second supporting spring 35 drives the second sliding member 33 to move along a direction far from the handle 31 so as to reset the handle 31. The second sliding member 33 includes a bearing 36 and a pulley 37 mounted to the bearing 36. The middle section of the cable 41, two ends of which are connected to the locking mechanisms, spools on the pulley 37. The two locking mechanisms 11, 21 may be provided with different distances to the handle 31. When the handle 31 is pulled, because of the different distances, it is easy to appear that one of the two locking mechanisms 11, 21 is unlocked and the other of the two locking mechanisms 11, 21 still locks. However, with the arrangement of the pulley 37, when one of the two locking mechanisms 11, 21 applies a big force to the cable 41, the cable 41 will easily move via the pulley 37 towards the one of the two locking mechanisms 11, 21 which applies the big force. As a result, the two locking mechanisms 11, 21 are adjusted to apply the same force to the cable 41. That is to say, the handle 31 applies the same force to the two locking mechanisms 11, 21. Under this condition, the two locking mechanisms 11, 21 can be simultaneously unlocked. The second sleeve 32 and the second sliding member 33 may be provided with noncircular configurations so that the second sliding member 33 can be prevented from rotating in the second sleeve 32.

The above embodiment can be applied to two two-point safety belts 1, or two three-point safety belts 2, or any combination of the two-point safety belt 1 and the three-point safety belt 2. The above safety belt unlocking mechanism is set at a position corresponding to each single passenger. However, in other embodiments, the safety belts can be respectively arranged on two passengers. Each safety belt is provided with a locking mechanism and a corresponding unlocking mechanism. Two ends of the cable 41 are respectively connected to the buttons of the unlocking mechanisms corresponding to the two passengers. Through pulling the handle, the safety belts of the two passengers can be unlocked simultaneously for reducing the workload of the passengers.

In a word, the description of the above embodiments is only used for the understanding of the present application. It should be noted that, those skilled in the art may make many improvements and modifications to the present application without departing from the principle of the present application, and these improvements and modifications also fall into the protection scope of the claims of the present application.

What is claimed is:

1. A safety belt unlocking mechanism for unlocking a locking member set on a safety belt from a locking mechanism, comprising:
    the locking mechanism comprising a button integrally formed therewith for unlocking the safety belt, the button automatically returning back after unlocking the locking member;
    a cable connected to the button; and
    a handle connected to the button via the cable;
    a first reversion assembly set on the cable for pulling the handle towards a position where the button returns back, when the handle is pulled; and wherein the first reversion assembly comprises a first sleeve provided with an upper restricting portion and a lower restricting portion, a first sliding member slideable between the upper restricting portion and the lower restricting portion, a first supporting spring mounted between the first sliding member and the lower restricting portion, and an engaging member on top of the first sliding member, the cable extending through the first sliding member and comprising an engaging portion fixed on top of the first sliding member, the engaging member being lockable with the button.

2. The safety belt unlocking mechanism as claimed in claim 1, wherein the engaging member and the first sliding member are integral or two-piece, the engaging portion of the cable being capable of extending through the engaging member.

3. The safety belt unlocking mechanism as claimed in claim 2, wherein an inner side of the first sleeve and the first sliding member comprise a protrusion and a recess along a sliding direction of the first sliding member, the protrusion and the recess being mateable with each other.

4. The safety belt unlocking mechanism as claimed in claim 1, wherein the upper restricting portion comprises a protrusion formed on an inner side of the first sleeve to resist against the first sliding member so as to prevent the first sliding member from continuing sliding.

5. The safety belt unlocking mechanism as claimed in claim 1, wherein the lower restricting portion comprises an opening for loading the first sliding member and the first supporting spring therein, a first baffle at bottom of the opening and at least one hook, the first sleeve comprising a slit communicating to a bottom side of the opening, one side of the first baffle being inserted into the slit and the other side of the first baffle being locked by the at least one hook.

* * * * *